H. W. BROWN.
HEADLIGHT.
APPLICATION FILED MAR. 25, 1918.
1,303,766.
Patented May 13, 1919.
2 SHEETS—SHEET 1.
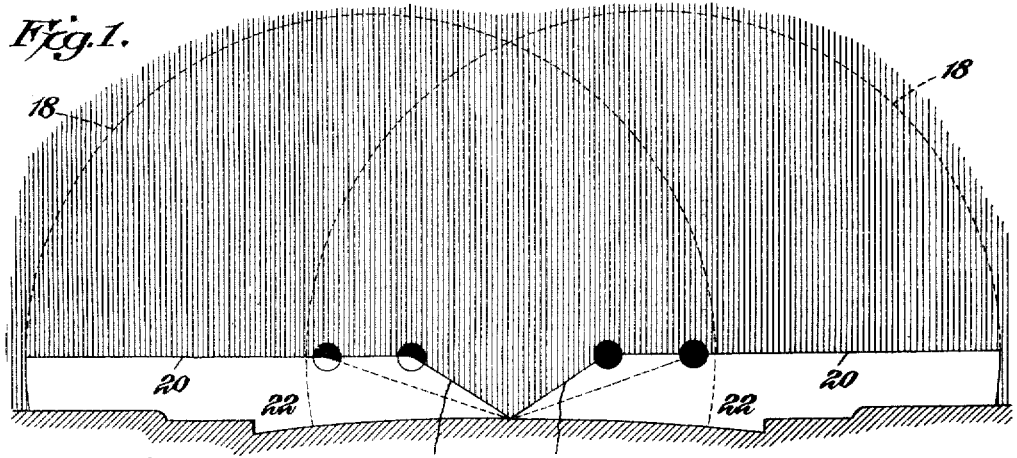
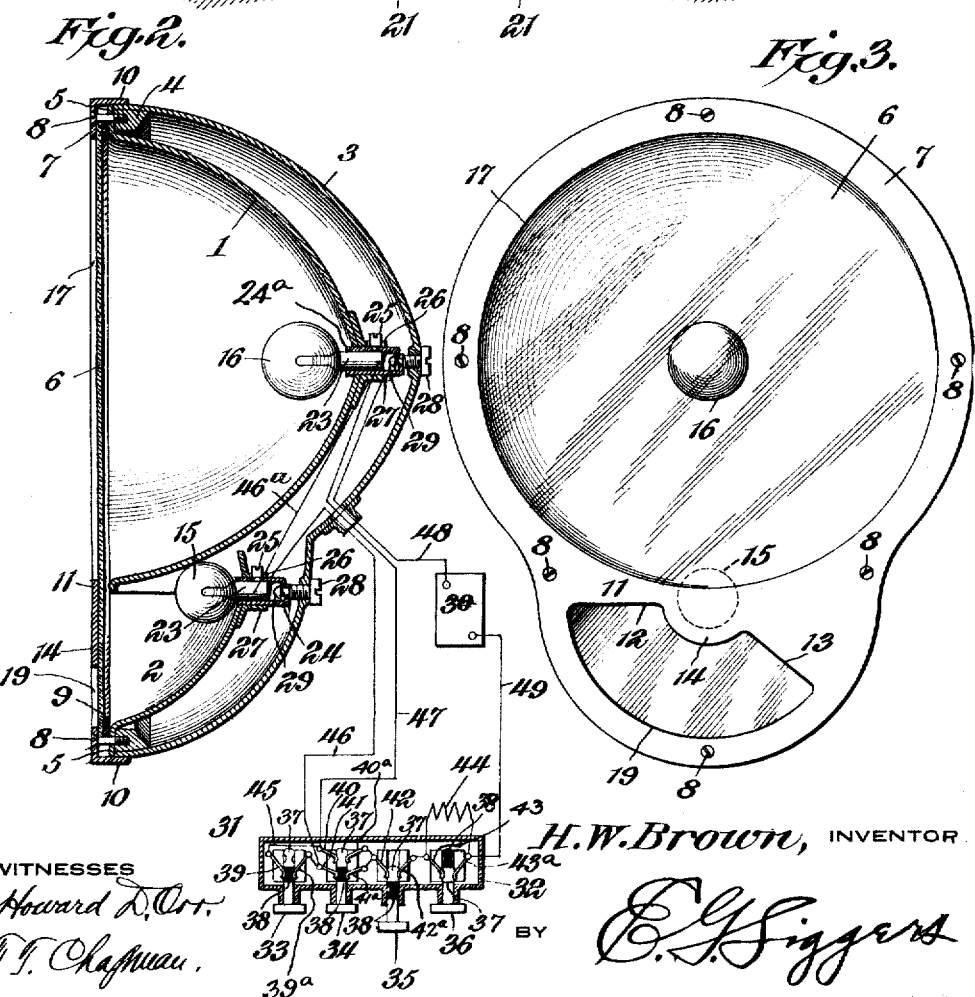
H. W. Brown, INVENTOR
WITNESSES

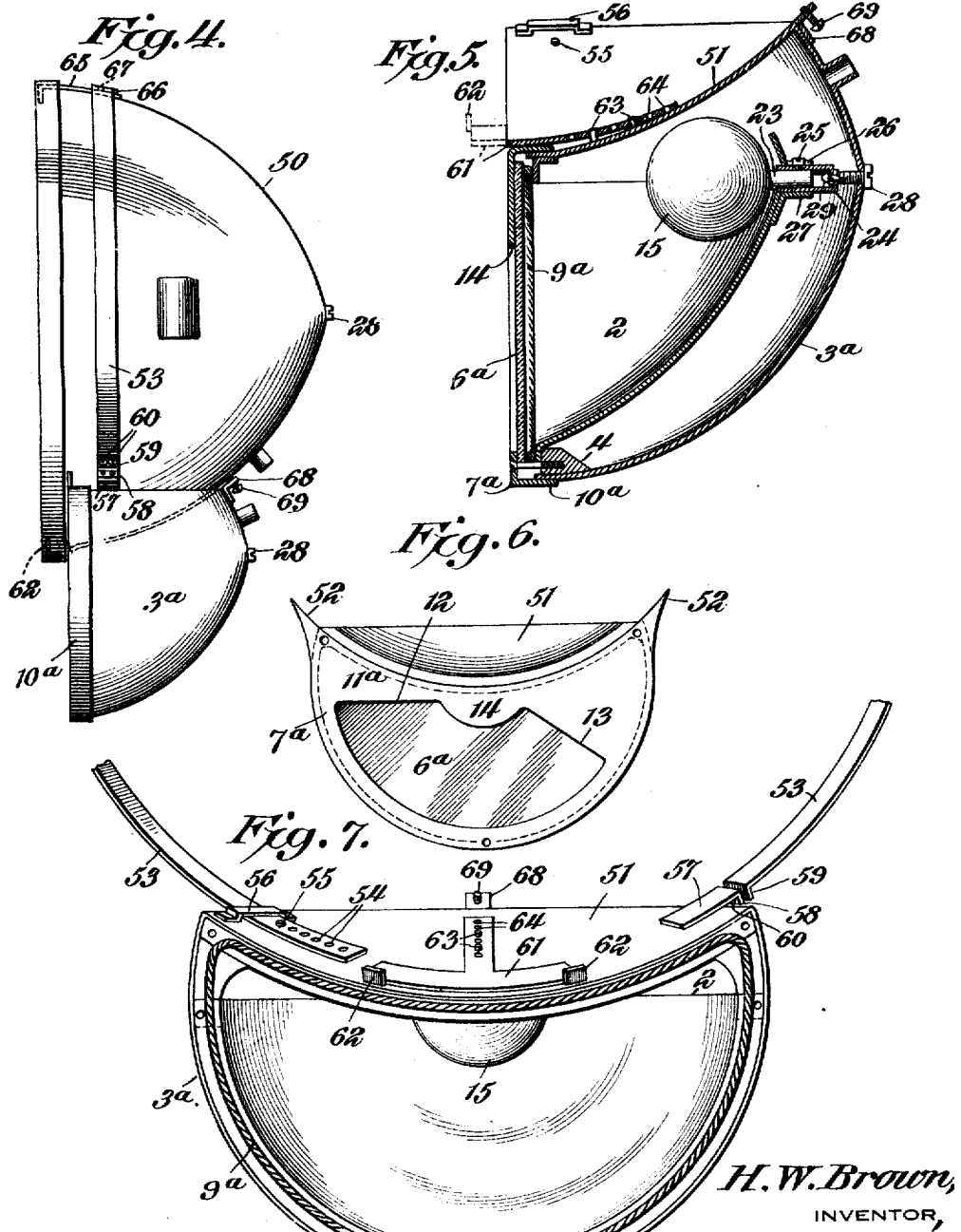

UNITED STATES PATENT OFFICE.

HERBERT WALDO BROWN, OF ASHLAND, OHIO.

HEADLIGHT.

1,303,766.   Specification of Letters Patent.   Patented May 13, 1919.

Application filed March 25, 1918. Serial No. 224,597.

*To all whom it may concern:*

Be it known that I, HERBERT W. BROWN, a citizen of the United States, residing at Ashland, in the county of Ashland and State of Ohio, have invented a new and useful Headlight, of which the following is a specification.

This invention has reference to headlights, and its object is to provide a headlight, intended especially for automobiles, whereby an intense and far reaching beam of light may be provided for traveling in sparsely settled communities or the illumination may be of a character to comply with various road laws regarding illumination, or both illuminating means may be used simultaneously whereby a still more intense illumination is obtained than by the first named means and the illumination may be made to approach very close to the front of the traveling vehicle.

In accordance with the invention the headlight may in part correspond to existing headlights and may in part provide a supplementary illuminating means to be used separately or in conjunction with the first named illuminating means. The supplementary illuminating means may be built in to the primary headlight or may be made as an attachment capable of being secured to existing headlights for increasing their range of usefulness. In either event provision is made for avoiding distracting glare from the supplementary headlight, which latter is designed for use in densely populated sections or where the law forbids glaring headlights.

The construction is such that the supplementary headlight is susceptible of manufacture at a considerable saving in cost because of its construction, and when of supplementary nature or made as an attachment the supplementary headlight may be tipped more or less with respect to the primary headlight and the forward projection of the beam of light may be thereby varied.

The invention also contemplates means whereby the beam of light projected from the supplementary headlight is so directed that the spread of illumination along a roadway is limited on the side of the traveling vehicle toward an approaching vehicle.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a diagram illustrating the operation of the headlights with respect to passing vehicles.

Fig. 2 is a vertical central section of the headlight structure where the primary and supplemental headlights constitute a single structure, the view including a diagrammatic representation of the electric switch control for the headlight.

Fig. 3 is a face view of the structure shown in Fig. 2.

Fig. 4 is a side elevation of a headlight embodying the invention, where the supplemental headlight is a separate structure from the primary headlight.

Fig. 5 is a vertical central section through the supplemental headlight of the character shown in Fig. 4, but drawn on a larger scale.

Fig. 6 is a front elevation of the supplemental headlight shown in Fig. 4, but omitting some parts.

Fig. 7 is a front elevation of the supplemental headlight as illustrated in Fig. 5, but omitting the front cover or casing lid and the front glass.

Referring first to the structure shown in Figs. 2 and 3, there is shown a reflector 1 which may be taken as of the usual parabolic form with the front opening defining a full circle. At a point immediately below the reflector 1 is another reflector 2 of smaller size and also of parabolic form while the front of the reflector defines but half a circle, whereby a parabolic reflector of full area and of proper size may be cut in two and form two reflectors 2.

The reflectors 1 and 2 are mounted in a casing 3 suitably shaped to inclose both reflectors so that, as viewed from the front, the casing defines the major portion of a circle with a lower drop portion. Wherefore, the casing is of inverted semi-obovoid form. The casing is, however, susceptible of considerable variation from the showing of the drawings.

In the mouth of the casing there is lodged a ring 4 conforming to the outline of the mouth end and secured thereto and forming a backing for edge flanges 5 on the reflectors 1 and 2. A plain glass sheet or pane 6 of obovate form is provided to close the mouth end of both reflectors and this glass pane is held in place by a casing lid 7 of obovate outline and held in place by screws 8 or in any other suitable way, the screws traversing the marginal portions of the reflectors 1 and 2 and entering the ring 4. To protect the glass 6 a packing strand 9 is interposed between the glass 6 and the marginal flanges 5 of the reflectors. The casing lid is formed with a marginal flange 10 telescoping over the mouth end of the casing 3.

Joining the sides of the casing lid coincident with the division line between the upper and lower reflectors is a web 11 having an upper curvature corresponding to the circular shape of the mouth end of the reflector 1 and having a lower edge with a straight portion 12 which, in the installed position of the headlight, is substantially horizontal and another straight portion 13 which latter in the installed position of the headlight slants at a suitable angle to the horizontal and vertical for a purpose which will hereinafter appear. The two edges 12 and 13 meet, at the central portion of the web, and merge into an arc-shaped lip 14, although the lip is not necessarily of such particular shape. Considering the lip 14 as of arc shape it is curved about a point which may be considered as in a prolongation of the longitudinal central axis of an electric lamp bulb 15 and has an area such that it hides the bulb 15 from view from the front of the headlight.

In the back of the reflector 1 there is located another electric light bulb 16 which may be of greater light giving capacity than the bulb 15. The light issuing through the glass 6 and through the front of the headlight as defined by the opening 17 represented by the inner margin of the main portion of the casing lid 7 is of large area as it recedes from the headlight and of generally circular outline and may be capable of giving brilliant illumination far ahead of the automobile upon which the headlight is installed. In Fig. 1 this area of illumination is roughly indicated by the dotted lines 18 which are assumed to represent the illumination of the main reflectors 1 of both headlights of the automobile.

The front opening of the drop portion of the casing lid, which opening is indicated at 19, represents considerably less than half the circle, the area being reduced by the drop portion 14 and the slanting edge 13 which cuts off a portion of the illumination toward that side of the traveling vehicle passing another vehicle going the other way, that is, on that side of the vehicle to the left of the operator of the vehicle. The illumination furnished by the supplemental reflector 2 as modified by the edges 12 and 13 and the drop lip 14 is indicated by the straight line 20 and the slanting line 21 on opposite sides of the headlight. Since, in Fig. 1, the lower or supplemental headlight is the one which is assumed to be giving light, there is produced an illuminated area 22 which of course will decrease in intensity as it recedes from the headlight in the different directions, but is quite sharply defined on the side of the headlight containing that portion of the web 11 provided with the slanting edge 13. The result is that the illumination to the operator's right is quite sufficient for driving at night in cities and towns, while the illumination to the left of the driver stops quite abruptly so that with passing vehicles there is no liability of blinding or confusing either driver because of intensified illumination due to the combination of the illumination furnished by both vehicles when passing. The line of demarcation may be confined quite closely to the center of the roadway considering the vehicles as remaining on the proper sides of the roadway. In this manner each vehicle may be seen by the driver of the other vehicle and the illumination of the roadway beyond the approaching vehicle may be ample to avoid accidents, and neither driver is confused by the light issuing from the other vehicle.

By properly slanting the edge 13 of the two separated headlights usually employed on an automobile so that the division lines 21 between the light and shadow may meet approximately at the roadway, there is a blending of the illumination without distracting streaks of light and shadow ahead of the vehicle.

The slant or angle of the edge 13 may be determined at the factory and is thereafter unchangeable, wherefore, the operator of the vehicle is insured of proper illumination without liability of distracting others.

When the vehicle is traveling in regions where brilliant illumination is not forbidden and becomes a necessity, the lamp 16 in the reflector 1 may be utilized or for more intense illumination both lamps 15 and 16 may be used.

For proper effects and to obtain the best results in illumination it is necessary that the bulbs 15 and 16 be suitably focused with relation to the reflectors 1 and 2. This is particularly true of the lamp bulb 15 and the reflector 2, since it is of importance that the lamp bulb 15 be so focused that no light rays are reflected upwardly so as to produce glare in the eyes of those toward whom the vehicle is traveling. To effect focusing, the lamp bulbs 15 and 16 are each provided with a stem 23 which may be inserted into and locked in a respective socket 24 or 24ᵃ with the terminals of the lamp in engagement with terminals in the socket, as is the usual custom. The socket 24 carries a set screw 25 projecting through a slot 26 in a holder 27 carried by the reflector 1 or 2, as the case may be, on the rear face thereof. A focusing screw 28 is carried by and threaded through the rear wall of the casing 3 opposite each socket 24, 24ᵃ and has a swivel connection 29 with the socket so that the latter with the lamp carried thereby may be adjusted forwardly or rearwardly in the longitudinal axis of the reflector.

In order to control the electric lamps 15 and 16 there is provided a current source 30 which may be a storage battery or a primary battery or some other suitable current source upon the vehicle. The current source 30 may be considered as a storage battery, since automobiles are very prevalently supplied with storage batteries for lighting and starting purposes.

To control the lamp a switch assembly 31 may be provided, such assembly being more or less diagrammatically illustrated in Fig. 2. There is a suitable casing 32 which may be made fast to the steering column or to any other appropriate part of the vehicle and this switch comprises a series of pull or push buttons 33, 34, 35 and 36, associated, the switch assembly being considered as made up of a group of four switch units, although such particular number of units is not obligatory. Moreover, in the particular showing of the drawings, the switches are assumed to be of the pull type, that is, on being drawn out they serve to close electric circuits and on being pushed in the circuits are broken. Each switch has a stem with a conducting section 37 and an insulating section 38 in alinement. The stem of the switch 33 is provided with opposed brushes 39, 39ᵃ, the stem of the switch 34 has two pairs of opposed brushes 40, 40ᵃ, and 41, 41ᵃ, respectively, the stem of the switch 35 has a single pair of opposed brushes 42, 42ᵃ and the stem of the switch 36 has a single pair of opposed brushes 43, 43ᵃ. The brushes 43, 43ᵃ are bridged by a resistance element 44 for a purpose which will hereinafter appear.

The brush 39 is connected by a conductor 45 to the brush 40. The brush 39ᵃ is connected to the brush 41 and the brush 41ᵃ is connected to the brush 42, while the brush 42ᵃ is connected to the brush 43. Furthermore, the brush 42 is connected to the brush 40ᵃ. All these connections are electrical. The brush 41 is connected by a conductor 46, carried in the casing 3, to one terminal of the socket 24 receiving the lamp 15. The brush 40 is connected by a conductor 47 to one terminal of the socket 24ᵃ carrying the lamp 16. Both sockets 24, and 24ᵃ, are connected in multiple by a conductor 48 to one terminal of the battery 30 and the other terminal of the battery is connected by a conductor 49 to the brush 43.

When all the buttons of the switch are pushed in all the brushes engage insulating material except the brushes 40, 40ᵃ and 43, 43ᵃ which bear upon conducting material, but as in this position of the parts the circuit is incomplete in the switch neither lamp 15 or 16 is energized.

Suppose that the button 35 be pulled out, this position being indicated in Fig. 2. There is now established a circuit from the battery 30 by way of the conductor 49 to the brush 43ᵃ, thence by way of the conducting portion of the button stem 36 to the other brush 43. Thence through the two brushes 42, 42ᵃ by way of the conducting part of the stem of the button 35, then bridging the brushes, to the brushes 40, 40ᵃ which are at the time bridged by the conducting part of the stem of the button 34. The circuit may further be traced by way of the conductor 47 connected to the brush 41 to the lamp 16, thence by way of the conductor 48 to the battery 30. This causes the lamp 16 to glow and brilliant illumination is caused by the lamp 16 and reflector 1. Should it be desired to dim the illumination the button 36 is drawn out, thus bringing insulating material 38 of the stem of the button 36 between the brushes 43, 43ᵃ, diverting the current through the resistance element 44, and thus cutting down the current furnished to the lamp 16 and dimming the light issuing therefrom.

If now the button 34 be pulled out the conducting material of the stem of this button is removed from between the brush 40, 40ᵃ and interposed between the brushes 41, 41ᵃ, whereupon, the circuit is broken with respect to the conductor 47 and established with respect to the conductor 46, which latter is connected to the lamp 15 and this lamp is connected by way of a conductor 46ᵃ to the conductor 48, thus establishing the circuit through the lamp 15 but cutting out the lamp 16. Now, illumination is furnished by the lamp 15 and the reflector 2 thus producing the effect illustrated in Fig. 1, that is, providing driving light of antiglare character for cities or other thickly populated communities.

If it be desired to use both lamps simultaneously then the button 33 is pulled out, thus bridging the brushes 39, 39ᵃ. There is then established a circuit from the brush 41 connected to the conductor 46 by way of the brushes 39, 39ᵃ and conductor 45 to the brush 40 connected to the conductor 47. The result is that both lamps are energized and the full power of the headlight is utilized, considering that the brush 36 is pushed in and the resistance 44 is thereby cut out. If it be desired to dim both lamps 15 and 16 when both are energized the button 36 may be pulled out as before.

The structure illustrated in Figs. 2 and 3 may be adopted for new headlights but features of the invention may be separately manufactured and applied to existing headlights, especially those having no supplemental light giving units of the anti-glare type.

For this purpose the construction illustrated in Figs. 4 to 7 inclusive, may be provided. In Fig. 4 there is shown a headlight 50 which may be considered as indicative of any one of the numerous types of existing headlights and which may be similar to the portion of the headlight of Figs. 2 and 3 containing the reflector 1.

There is provided a casing 3ª in the arrangement illustrated in Figs. 4 to 7, which casing incloses a reflector 2, an electric lamp bulb 15, an abutment 4, a casing lid 7ª similar to the casing lid 7 of Figs. 2 and 3 but less extensive, a glass front plate 6ª similar to the glass front plate 6 of Figs. 2 and 3, but less extensive, and packing 9ª similar to the packing strand of Figs. 2 and 3. The casing cover 7ª has a flange 10ª telescoping onto the casing 3ª and the casing has a top member 51 provided therefor and hereinafter referred to. The upper edge of the casing cover 7ª is provided with a cross web 11ª having on one side a substantially horizontal edge 12, a central depending tongue 14 and a slanting edge 13 of the other side, these parts serving the same purpose as similar parts of the web 11 of the structure shown in Figs. 2 and 3. The top 51 is dished so as to fit snugly under and against the bottom portion of the casing 50, while the front casing plate 7ª has horns 52 at its upper corners to aid in bracing the structures when assembled.

There is provided a strap 53 of a length to encircle the casing 50 at a suitable distance behind the mouth thereof and this strap at one end has perforations 54, any one of which may receive a pin 55 projecting from the top 51 while a clip 56 fast to the top 51 serves to hold the strap 53 close to the top 51 and against the accidental escape of the strap from the pin 55. The strap 56 and pin 55 are adjacent to one side of the casing 3ª of the supplemental headlight unit, while at the other side of the casing there is secured thereto a strip 57 having a terminal flange 58. That end of the strap 53 remote from the perforated end terminates in the flange 59 adjacent to the flange 58 and these flanges are joined by one or more screws 60 so that the corresponding end of the strap 53 may be firmly united to the corresponding side of the casing 3ª to tightly bind about the supplemental headlight casing. In order to prevent the supplemental casing 3ª from pulling away from its position with relation to the casing 50, another strap 61 with spaced terminal fingers 62 is lodged on the top 51 and the latter carries pins 63 traversing corresponding ones of perforations 64 in the strap 61. The fingers 62 are designed to engage over the front of the headlight casing 50 to hold the supplemental casing 3ª from moving rearwardly. To prevent similar movement of that portion of the strap 53 at the top of the casing 50 there is provided a hook 65 engaging the strap 53 and capable of limited adjustment by reason of pins 66 in the hook and a perforation 67 in the strap.

In order to tilt the supplemental headlight to a limited extent to vary the forward projection of the light issuing therefrom, there is made fast to the rear of the casing 3ª a bracket 68 traversed by a set screw 69 positioned to bear against the casing 50 and so allow a certain degree of rocking movement of the casing 3ª about a substantially horizontal axis.

The bulb 15 of the structure shown in Figs. 4 to 7 may be provided with a focusing arrangement, such as has been described with reference to Fig. 2, and further description thereof is deemed unnecessary, Fig. 5 containing the same reference numerals as are applied to the similar parts in Fig. 2.

The switch arrangement described with reference to Fig. 2 may be applied to the structure shown in Fig. 4, therefore, it is not deemed necessary to make any showing in Fig. 4 of the switch structure shown and described with reference to Fig. 2, since the application of the switch to the structure of Fig. 4 will be clearly evident from the showing in Fig. 2 and the description with reference thereto.

The operation of the structure of Fig. 4 and associated figures is clearly apparent from the description of the operation of the structure of Fig. 2 and need not be repeated with reference to Fig. 4 and associated figures.

What is claimed is:

1. A headlight provided with two closely associated superposed reflectors with the emitting end of the upper reflector defining a full circle and the emitting end of the lower reflector defining less than half a circle, with a centralized drop hiding the light giving unit of the lower reflector, and having at one side of the centralized drop a slanting top edge.

2. A headlight provided with two closely associated superposed reflectors with the emitting end of the upper reflector defining a full circle and the emitting end of the lower reflector defining less than half a circle, with a centralized drop hiding the light giving unit of the lower reflector, and on one side of the centralized drop the opening having its top edge slanting and on the other side of said drop having its top edge substantially horizontal.

3. A headlight structure provided with two closely associated superposed reflectors and light giving elements individual thereto, the upper reflector having an emitting end defining a full circle and the lower reflector having an emitting end of segmental form including less than half a circle with the top edges radial to the optical axis of the lower reflector, one radial edge being substantially horizontal and the other slanting.

4. A headlight structure provided with two closely associated superposed reflectors and light giving elements individual thereto, the upper reflector having an emitting end defining a full circle and the lower reflector having an emitting end of segmental form including less than half a circle with the top edges radial to the optical axis of the lower reflector, one radial edge being substantially horizontal and the other slanting, said light emitting end of the lower reflector being provided with a centralized depending light shield hiding the light emitting element from direct view.

5. A headlight provided with two closely associated superposed reflectors, with the lower reflector having a light emitting opening of segmental form defining less than half a circle and with its central radius tipped to bring one end of the opening substantially horizontal and the other end slanting.

6. An anti-glare headlight outfit for an automobile employing headlights on opposite sides of its center line of travel, each headlight having a light emitting opening with its top portion in part on a substantial level with the optical axis of the headlight and the remainder of the top portion slanting downwardly on the side approaching vehicles, the slant of the last named side being different in the two headlights to bring the angles of slant in coincidence at approximately the level upon which the vehicle is traveling.

7. In a headlight, a reflector having its upper edge and its optical axis in one plane, means for carrying a light unit in said optical axis, and a cover at the light emitting end of the reflector having a fixed opening of segmental form with the central radius of the segment tilted.

8. A headlight structure for automobiles having superposed reflectors with the upper reflector having its front end defining a full circle and the lower reflector having its front end defining half a circle, and a light shield for the front end of the lower reflector with an opening therethrough of segmental form with its mid-radius slanting.

9. A headlight structure for automobiles provided with superposed reflectors with the lower reflector smaller than the upper reflector and both reflectors having casing means together defining a semi-obovoid structure, and cover means for the reflectors with openings of full circular form for the upper reflector and of partially circular form for the lower reflector, the cover means being on the exterior of the casing structure and that portion of the cover means over the lower reflector having a drop part preventing direct view of a light giving element when installed in the optical axis of the lower reflector.

10. A supplemental headlight structure for attachment to a main headlight, comprising a casing having a dished top portion to fit under the main headlight structure, a reflector in the casing, a strap connected to the top of the casing for encircling the main headlight structure, and hook members on top of the casing for engaging the front portion of the main headlight structure.

11. A supplemental headlight structure for attachment to a main headlight, comprising a casing having a top portion to bear against the bottom portion of the main headlight, a strap having adjustable connections at the ends with the casing of the supplemental headlight and of a length to encircle the casing of the main headlight structure, and hooks and an adjustable mounting therefor located on top of the casing of the supplemental headlight for engaging the front portion of the main headlight.

12. A supplemental headlight structure for attachment to a main headlight, comprising a casing having a top portion to bear against the bottom portion of the main headlight, a strap having adjustable connections at the ends with the casing of the supplemental headlight and of a length to encircle the casing of the main headlight structure, and hooks and an adjustable mounting therefor located on top of the casing of the supplemental headlight for engaging the front portion of the main headlight, the supplemental headlight having adjustable means for engaging the main headlight to tilt said supplemental headlight with respect to the main headlight for varying the direction of projection of light from the supplemental headlight.

13. A supplemental headlight structure having attachment to a main headlight structure below the latter, having means for securing the supplemental headlight structure to the main headlight structure, and means for tilting the supplemental structure with relation to the main structure to vary the tilt of the supplemental structure with relation to the main structure.

14. A supplemental headlight attachment for main automobile headlights, comprising a reflector and casing therefor and means for carrying a light giving element in the optical axis of the reflector, suspension means for securing the supplemental headlight to the main headlight beneath the latter, and means for attaching the front of the supplemental headlight to the front of the main headlight.

15. A supplemental headlight attachment for main automobile headlights, comprising a reflector and casing therefor and means for carrying a light giving element in the optical axis of the reflector, suspension means for securing the supplemental headlight to the main headlight beneath the latter, and means for attaching the front of the supplemental headlight to the front of the main headlight, said means being adjustable toward the front or rear of the supplemental headlight to vary the relation of the supplemental headlight to the main headlight correspondingly.

16. A supplemental headlight structure for attachment to a main headlight of an automobile, comprising a casing with a dished top portion to fit beneath the main headlight structure, the supplemental casing being provided with forwardly projecting hooks adjustable toward the front and rear for engaging over the front of the bottom portion of the main headlight, and a strap of a length to encircle the main headlight and provided with a hook member for engaging the front of the main headlight structure at the top thereof, the ends of the strap and the casing of the supplemental headlight having coacting adjustable connections for clamping the strap tightly about the main headlight to hold the supplemental headlight in place thereon.

17. A headlight structure comprising two superposed reflectors and casings therefor, with the lower reflector independent of the upper reflector and having its casing or body portion rounded at the lower part and concaved at the upper part with the concavity shaped to receive the corresponding portion of the casing of the upper reflector, and a glass cover plate for the lower reflector rounded in conformity with the body of said lower reflector and concaved where adjacent to the body portion of the upper reflector.

18. A headlight structure for vehicles provided with two closely associated reflectors and light-giving elements individual thereto, and border-covering means for the reflectors, one causing the emitted beam of light from the respective reflector to be of full circular cross section and the other causing the beam of light emitted from the corresponding reflector to be of less than half a circle in cross section with the upper edge of the border-covering means for said reflector limiting the top of the beam to the height of the optical axis of the light giving element and reflector containing it and having that side of the beam toward an approaching vehicle fixedly limited to a less height than said optical axis, whereby the lateral spread of the second beam of light is correspondingly lessened on the side toward an approaching vehicle.

In testimony that I claim the foregoing as my own I have hereto affixed my signature in the presence of two witnesses.

HERBERT WALDO BROWN.

Witnesses:
J. C. FRENTZ,
C. C. GAULT.

Copies of this patent may be obtained for five cents each, by addressing the "Commissioner of Patents, Washington, D. C."